US010679279B2

(12) United States Patent
Ward et al.

(10) Patent No.: US 10,679,279 B2
(45) Date of Patent: *Jun. 9, 2020

(54) INDOOR LOCATION MAPPING AND WAYFINDING SYSTEM

(71) Applicants: Frank Daly Ward, Reno, NV (US); Steven James Faletto, Chicago, IL (US)

(72) Inventors: Frank Daly Ward, Reno, NV (US); Steven James Faletto, Chicago, IL (US)

(*) Notice: Subject to any disclaimer, the term of this patent is extended or adjusted under 35 U.S.C. 154(b) by 160 days.

This patent is subject to a terminal disclaimer.

(21) Appl. No.: 15/904,331

(22) Filed: Feb. 24, 2018

(65) Prior Publication Data

US 2018/0197229 A1 Jul. 12, 2018

Related U.S. Application Data

(63) Continuation of application No. 14/456,102, filed on Aug. 11, 2014, now Pat. No. 9,940,663.

(51) Int. Cl.
    *G06Q 30/06* (2012.01)
(52) U.S. Cl.
    CPC ............................... *G06Q 30/0639* (2013.01)
(58) Field of Classification Search
    None
    See application file for complete search history.

(56) References Cited

U.S. PATENT DOCUMENTS

| 5,914,671 | A | 6/1999 | Tuttle |
| 6,456,239 | B1 | 9/2002 | Werb |
| 6,674,403 | B2 | 1/2004 | Gray |
| 6,717,516 | B2 | 4/2004 | Bridgelall |
| 6,920,330 | B2 | 7/2005 | Caronni |
| 7,091,863 | B2 | 8/2006 | Ravet |
| 7,328,028 | B2 | 2/2008 | Carlson |
| 7,365,645 | B2 | 4/2008 | Heinze |
| 7,551,089 | B2 | 6/2009 | Sawyer |
| 7,932,832 | B2 | 4/2011 | Hayashi |
| 7,997,486 | B2 | 8/2011 | Ulrich |
| 8,629,751 | B2* | 1/2014 | Maher ................... H01C 7/126 338/20 |
| 8,774,830 | B2* | 7/2014 | Ziskind ................... G06N 3/08 455/456.1 |
| 9,064,265 | B1 | 6/2015 | Sheikh |
| 2004/0193492 | A1 | 9/2004 | Applebaum |
| 2007/0034692 | A1 | 2/2007 | Johnson |
| 2010/0030624 | A1 | 2/2010 | Vanska |
| 2011/0087430 | A1 | 4/2011 | Boss |

\* cited by examiner

*Primary Examiner* — Sarah B McPartlin
(74) *Attorney, Agent, or Firm* — The Law Forge; Frank Ward

(57) ABSTRACT

An Indoor location mapping and wayfinding system for mapping waypoints on an interactive mapping system that can function both indoors and outdoors based on user selections and location. It can include a shopping system that allows users to pre-select items for purchase, maps the items on an indoor map of the store, and provides a route to the user for the collection of the selected items.

11 Claims, 15 Drawing Sheets

INDOOR LOCATION MAPPING AND WAYFINDING SYSTEM

CROSS REFERENCE TO RELATED APPLICATIONS

This application is a Continuation of application Ser. No. 14/456,102.

BACKGROUND OF THE PRESENT INVENTION

Field of the Invention

The present invention is a system for mapping waypoints on an interactive mapping system that can function both indoors and outdoors based on user selections and location. One example is a shopping system that allows users to pre-select items for purchase, maps the items on an indoor map of the store, and provides a route to the user for the collection of the selected items.

REFERENCE REGARDING FEDERALLY SPONSORED RESEARCH OR DEVELOPMENT

Not Applicable to this invention.

BACKGROUND

Shopping has long been a cornerstone of the United States economy and is something that must be done, whether for entertainment or necessity. Though shopping has changed over the course of human history, currently three main shopping experiences exist. In store, online or catalog orders, with home delivery, or online purchase with in store pick up.

In store purchases require the customer to trek to the physical store, search for the desired items within the store, and then purchase the desired items from a store clerk. This traditional in-store experience has high search costs, forcing the customer to actively pursue the desired items in the store, which are often strategically placed by merchants to require the customer to traverse a large portion of the store. Forcing the consumer to remain in store increases the chances that the customer will make an impulse purchase. However, this leads to consumers being be discouraged from visiting merchants that require the consumer to traverse a large area when attempting to locate their items, because it requires a significant time and energy investment. The in-store experience also involves merchant employees or salespersons, which many consumers find overly intrusive or inconvenient, which can ruin an otherwise pleasant shopping experience. Finally, popular merchants may experience periods of high consumer traffic (i.e. during the holidays), resulting in long wait times, store congestion, or a lack of stock of desired items.

To reduce queue sizes and reduce overhead, stores have implemented "self check-out" kiosks, which allow a customer to scan and bag an item themselves, rather than having a clerk do so. However, this inconveniences the customer by requiring them to act as a store clerk, and in many cases the customer cannot purchase desired items without a clerk's approval, which negates any time savings realized by checking yourself out.

In contrast, online and mail order sales require the customer to search the internet or catalog for the needed items, and once purchased pay to have the items are shipped to the customer's home. Online sales, however, suffer from a unique set of problems. In addition, the lack of physical items or accurate descriptions may result in the accidental purchase of incorrect or low quality items. This is compounded by the inability of customers to touch or test the item in person, which many consumers find beneficial in making a purchase. Lastly, the delay or cost associated with having the item shipped to the customer may be impractical in some circumstances.

Online sales suffer from a unique set of additional problems as, the internet hosts a considerable number of fraudulent websites, leaving the customer vulnerable to exploitation, unless they take arduous security precautions. Further, consumers shopping in an online store are not provided with indications of merchant trustworthiness, such as store location, condition, or local reputation, which may result in shoppers purchasing from untrustworthy or fraudulent merchants. To address this problem, online retailers have created ratings systems, which reduce the risk of untrustworthiness or low quality, however the customer is still not able to test or fully view the item, and must wait for the product to be delivered.

The third method is a hybrid, with the purchase being made online, and the item being received in store. In practice, this means that the customer must go to the store and contact the clerk at the appropriate desk, if available, whereupon the item will be pulled from the shelf by an employee. While providing the benefit of allowing the user to peruse the store's stock from their own computer, the in-store pick up system still suffers from the inconvenience of having to wait for an employee to locate all of the desired items from the shelves and the inability for the customer to touch, see, or use the items before committing to purchase. Unless the customer peruses the store prior to the purchase, which would negate any time savings realized by purchasing online, the customer has no chance to personally investigate the items In all three systems, advertising has become increasingly important, both to merchants and to customers. Traditionally, its function has been to alert customers to the availability of a product or service and to entice the customer into purchasing it. Advertising has many forms, including word of mouth, print, radio, television, or internet advertising.

Word of mouth is likely the oldest type of advertising, and relies on customers telling other customers about the product and allowing this to generate sales. Unfortunately, this type of advertising is slow and relies on the goodwill of the customer, and is limited in scope.

In contrast, radio, print, and television advertising can reach a much larger audience more quickly, by disseminating an advertisement through electronic or printed publication. However, the publication must be chosen with care to ensure that the readership would be interested in the advertised product. Being limited by this need to be target the audience, effective advertising requires extensive research.

In contrast, internet advertising not only reaches a much larger audience, it can be targeted much more easily. However, to achieve this targeting internet users must be tracked and the data analyzed to determine the relevant targeting characteristics. Constant monitoring raises not only privacy concerns, but can also require extensive data analysis to pick the few relevant factors from the swathes of data collected.

After considering the current systems, the following system was conceived to address the deficiencies of the current systems, without sacrificing any existing advantages. One object of the conceived location system is to solve the issues associated with existing shopping experiences, including inconvenience, inaccuracy, and unavailability of products.

SUMMARY OF THE INVENTION

One feature of the present location system is the discovery that the customer's shopping experience can be made more convenient and less time consuming by allowing the customer to select the desired items online and by guiding them through the process of acquiring and purchasing their items using their mobile device of choice.

According to one embodiment of the present location system (or wayfaring system) is a method and apparatus for purchasing a product through a mobile device (e.g. mobile telephones, mobile computer, tablet computer, smartwatch, laptop, Google Glass, and any other portable device with the ability to convey information), and being directed to the product in the physical world. Using this location system, buyers can add potential purchases to an online shopping cart via an application, a business's website, or a third party website. The buyer can specify a particular geographic store among a plurality of stores (e.g., a particular local Wal-Mart). The system on the website or application then plots all of the items in the shopping cart onto the internal (i.e. indoor) map of the selected geographic location, thus enabling buyers to efficiently plan their routes around the store, while simultaneously acquiring everything on their list. Additionally, the system may be configured to automatically generate an optimal route in order to retrieve all of the items on the list, thereby saving the customer from having to plan a route. The route planning may be extended to include directions to the store, and then directions inside the store. The optimization may be based on total distance, time, products selected, number of customers, and/or item type. The user may either add all of the items to a list of items that will be purchased at the register of the store, or alternatively may purchase the items online, pick them up using the map in-store, and then present their electronic receipt in-store without paying at the register. This enables users to pay with internet-only services (e.g., Paypal, Bitcoin, or other equivalent electronic funds transfer).

To further increase the time efficiency of the location system, it can be configured to include clerkless checkout. By affixing a unique wireless transmitter to each item or item type, the items in the user's possession can be tracked. Upon nearing or reaching an exit, the items in the user's possession can be checked against the list of items. If any items are missing or if extra items are present, the user can be notified via their mobile device and/or be charged or credited, as required. Used this way the system eliminates the need for any physical interaction between the customer and the merchant.

As advertising has become an integral part of shopping, the location system can be configured to include active advertising. Using the described system, which tracks the user's current location, stores can use digital displays in order to target shoppers as they walk by various displays located in the store. Further, the merchants, by gathering multiple shoppers' habits over time, can then use the data to optimize the layout of the items stocked in the store.

In addition to the items purchased, the shopper's overall path may be used to target advertisements both in-store and at a later time. In-store advertising may be performed on the user's mobile device, or may be provided on displays located throughout the store. For example, if a user visits areas of the store that are not associated with the items on their list (e.g., a health food or pharmacy section) but does not select an item from that section, the merchant may then send advertisements or coupons relating to health and wellness products to the user. This type of targeted advertising will increase the likelihood of an impulse purchase. Additionally, advertisers may pay the store, system provider, or third party with control over route optimization to modify the user's route so that the user travels past the advertiser's products, or travels near a section of the store selected by the advertiser.

The system may also provide notifications to users when they are in the store or approaching an exit reminding them to purchase items based on the user's previous purchase history or based on the other items on the list. For example, if a user purchases a particular item most visits to the store, the system may remind the user to purchase the item, even if the item is not on the current list. Additionally, if a user is purchasing items that are usually associated with other items (i.e. spaghetti noodles and sauce), the system may prompt the user to purchase the item, as it is frequently purchased in conjunction with the item on the user's list.

In another embodiment, the user adds potential purchases to an online shopping cart via a mobile application, a businesses' website, or other type of application, and the shopping cart list is saved to their mobile device or otherwise associated with the user. The user may then travel to a brick-and-mortar store to purchase or pick up the items. This store may be one located nearest the user or one selected by the user. Once in store, the user is directed to the items using wireless RFID tags or similar wireless transponders on the items themselves, or on the store's shelves (e.g., a price tag on a shelf that is associated with multiple items). When pinged with a wireless transmission, the transponders (e.g. RFID tags) emit a unique identification code, which allows the items location to be calculated relative to the user. The transponder data is collected by the user's mobile device or by an in store system. The data collected from the transponders can then be used to locate the transponder(s) relative to the user's mobile device (e.g. Smartphone, smartwatch, Google Glass, etc), and items located within the store. This allows for the system, in this embodiment, to dynamically map the location of the items within the store as the user navigates the store. Thus, the item's locations do not need to be known prior to the user entering the store.

Alternatively, the store may also wirelessly transmit the physical layout (e.g. floor plan) of the store to the user's device upon arrival. After receiving the layout data, the user will be shown the layout of the store on his mobile device. Then the system detects the identified item(s) location(s), by pinging the transponders associated with the identified items. Thereafter, the mobile application will plot the item locations on the layout map, and display the map with item locations on the user's mobile device. The store's system also tracks the user's location, relative to the transponders and displays the user's current position on the layout map. The user may then gather the desired items and proceed to checkout, as described in the previous embodiment.

By using multiple re-programmable wireless location transponders, the store may stock items in various locations. For example, a chain store in one town may stock items in different locations than another store, in another town, and using the above system, would not need to frequently update its layout on the online services, as it would have to if it manually plotted item locations. as an added benefit, some types of transponders (e.g. RFID tags) can be encoded with a UPC associated with the item. The store can then, replace the UPC encoded in the transponder with the UPC of the new item to be placed on the shelf, if the item is discontinued or moved. Thus, allowing the store to re-use transponders, and saving the store the cost of replacing them.

In any previous embodiment, and also in other possible embodiments, store may use any wireless system (e.g. Bluetooth, WiFi, etc.) that locates the user via signal strength, latency or any equivalent system. The possible wireless systems include WiFi, cellular, GPS, and Bluetooth. Thus, the store is allowed flexibility in selecting the wireless system which best conforms to the local conditions and regulations on wireless systems.

Measuring the signal response time allows the linear distance between the device and the transmitter to be calculated, by any appropriate method (e.g. Propagation delay based positioning). Once this distance is determined, the location of the device may be found using trilateration or any equivalent method (e.g. triangulation, multilateration, etc.).

In any previous embodiment, and also in other possible embodiments, the location system may be augmented and streamlined by including a self-checkout feature. In one possible embodiment, NFC (near field communications) or an equivalent may be used to streamline the checkout process for prepaid customers. While shopping, the customer's mobile device scans and logs each item placed in the customer's basket, via NFC, and transmits a log of the items to the store's checkout kiosks. As the customer approaches the checkout kiosk, the kiosk scans the contents of the customer's basket, using NFC. Then the mobile application or the kiosk compares the contents of the basket to customer's original list, and the log. Then the system requests further funds for any items that were not pre-purchased, and prepares a paper or electronic receipt for the customer upon receipt of the funds. All fund transfers may be completed from the mobile device, so that the customer is not required to interact with the kiosk, unless they desire to do so. In practice this system would allow a prepaid customer to enter the store, collect the items and then leave without ever needing to interact with a clerk or self-checkout kiosk. The system will already have a record of the order, since it has been prepaid. The system may either recognize the shopper based on a unique identifier associated with their wireless device, or the shopper may use a kiosk to enter an order number, account number, or other unique identifier associated with the shopper or list of purchased items.

In any previous embodiment, and also in other possible embodiments, NFC (near field communications) or an equivalent may be used to streamline the checkout process for prepaid customers, and may also be used for security purposes. In this embodiment, NFC reader terminals are placed near merchant exit points. These terminals may consist of multiple NFC readers distributed within a terminal structure to allow for the scanning of all items within the cart simultaneously. NFC tags are affixed to all items within the store. When users place their baskets or shopping carts on/in the NFC checkout terminal, the NFC readers on/in the terminal scans all items present, and forms a list. This list may be used to generate an invoice total for the user to pay at this point. Alternatively, the generated list may be cross-referenced with a list of items that the user has pre-paid for either online, with a mobile application, or other suitable pre-payment method. If any of the scanned items have not been pre-paid, an invoice for these items will be generated.

This offers flexibility for the user; additional in-store items may be purchased in addition to the pre-pay items without having to alter their pre-payment amount. It also provides a layer of security to self-checkout style transactions; if a user attempts to leave the store with items that have not been pre-paid, the system may alert the appropriate security personnel or systems to prevent shoplifting. If there are items on a user's shopping list that have not been scanned, the system may also remind the user at this point that items have not been picked up. The system may generate a physical receipt after all items have been scanned/paid for, or an electronic receipt may be sent to the user's mobile device via the mobile application, e-mail, or other suitable means of electronic communication.

The process may be further streamlined by offering Online pre-payment for streamlined checkout in-store. The user gathers all items on his or her list, runs the basket or shopping cart through the NFC checkout terminal, which scans all items and confirms that they have been paid for and that no items have been forgotten, and then the user receives a receipt and exits the store. Pre-payment may be performed in advance on the system's web application, within the mobile application, or at the store before picking up any of the items, for example, at a kiosk at the merchant's entrance, which may be advantageous due to checkout locations frequently being bottleneck points within merchant locations.

The pre-payments may also be processed using the mobile application while in the store. As a user selects items, the user may use their mobile device's NFC reader or barcode scanning features to scan the item and immediately pay. This enables the user to use the NFC checkout terminal without having to process payments at the register.

The flexibility of payment options facilitates enhanced user experience while simultaneously providing for the elimination of potential shopper bottlenecks by providing payment options before the shopper enters the store, at the entrance to the store, while shoppers are picking up items within the store, and finally at the checkout counters located near the exit.

A further refinement of the system allows for the use of an intelligent list generation and planning system. Even when a shopper plans a trip to a merchant in advance and compiles a list, needed items not on the list may be forgotten. As such, a system that intelligently predicts and suggests items to the user is advantageous.

For example, in one embodiment, a user having cereal may additionally require milk. The system can provide this suggestion based on a number of factors. Item pairing and combination may be done by observing user purchases; if users who buy item X usually also buy item Y, the system can suggest either item when the other is present on a user list. Additionally, if a specific user usually purchases one item in conjunction with others, but the pattern is not necessarily expressed across all users of the system, the system may provide targeted suggestions for complimentary items to the specific user. The system may also be instructed to recognize task-based item compliments. For example, if a user has added a number of items typically purchased for travelling, the system may suggest other items that may be useful for traveling, such as travel-sized items. Similarly, the system may take into account the date or time of purchase. If a user has added a school supply to a list surrounding the beginning of a school year, the system may recommend other commonly purchased school supply items. If a user is purchasing eggs in the morning, the system may recommend other popular breakfast items, and if a user is purchasing dinner ingredients in the evening, the system may recommend complimentary wine or other beverage.

By observing purchases from a large number of users over time, the system is capable of learning shopping habits and providing recommendations with increased accuracy. This also offers merchants and advertisers with a number of advantages. Merchants can query the system and observe user purchasing habits. Thus providing the merchant with the information necessary to make changes to in-stock supplies. Additionally, because the location of each item is known, merchants may also change the location of items within the store to increase the likelihood of impulse purchases, as well as optimize user routes within the store to either increase or decrease time spent in the store, or to decrease user frustration due to in-store travel times between various items. By knowing the travel times, the system itself may also intelligently re-route users to reduce congestion.

Additionally, the system can be configured to track users across several stores; using Wi-Fi based location services for pinpointing a user's location indoors, and for plotting that user's location on a layout map of the merchant's store. In environments with multiple merchants within an indoor space, for example an indoor shopping mall, the system, in any possible embodiment, may be adapted to transition the map from one merchant's in-store layout to an interior of the shopping mall, allowing for the navigation of the shopping mall without the need for an additional mapping application. Additionally, if the other merchants have subscribed to the system, the application can seamlessly transition to another merchant's in-store layout when a user enters the store. In an outdoor multi-seller environment, for example, an outdoor shopping, "strip," or outlet mall, a similar technique may be used. In an outdoor environment, traditional GPS and Wi-Fi based location services may be used. Finally, in another embodiment, the system may also be used to connect geographically distributed merchants that subscribe to the service (i.e., merchants that are not at the same physical location). In such a system, the application may transition from merchant in-store layout to a traditional turn-by-turn road direction system, or may also provide related walking, cycling, or public transportation services.

These multi-seller system embodiments allow for route planning across multiple merchants. Users may select items for purchase at multiple merchants in advance, and the system will not only optimize the in-store routes, but can also optimize the user's travel between stores, either inside the original structure or between structures. The waypoint planning may be achieved using a number of different variables, such as: shortest path, travel time due to traffic, travel method, temperature (e.g., buy frozen or hot items last to eliminate waste), or time sensitivity (e.g., store closing, sale, or congestion periods).

As a final illustrative possible embodiment, the system for indoor route planning and tracking includes a user interface, which may be displayed on any mobile device, including smartphones, portable computers, portable terminal, or any other type of mobile computer. It also includes, a structure map database, which contains a structure map of an identified structure, such as a store, and an item database containing item information, such as prices and optionally locations within the store. Item selection is done via an item selection system, wherein, a user may select an item from the item information database using the user interface. The item selection system is operable to allow a user to identify a structure (store) and at least one item for plotting on a map of the structure.

The map of the structure may be retrieved from the structure map database, and the item information for each said identified item is retrieved from said item database. Next, an item summary view presents the identified structure and identified items to the user via the user interface. Then the system determines the user's location via a user location determination system, which is comprised of a plurality of wireless transceivers, which may be WiFi, Bluetooth, cellular, or any equivalent, operable to transmit wireless signals, wherein the location of said transceivers within the identified structure is known, a wireless device associated with said user, and user location determination logic operable to perform a method for identifying the current position of said user within the identified structure.

The user location determination logic performs the following method for identifying the current position of said user within said identified structure. The system receives from each of the wireless transceivers a user device latency value, wherein the user device latency value is determined based on signals received by said wireless transceivers from said user device. Next, the system receives from the user device a plurality of transceiver latency values, and determines an approximate current location for the user within said identified structure based upon at least one of the user device latency values, and at least one of the transceiver latency values.

Alternatively, the user location determination logic may perform the following method for identifying the current position of the user within said identified structure. The system receives from each of the wireless transceivers a user device signal strength value, wherein the user signal strength values are determined based on signals received by the wireless transceivers from the user device.

Upon receiving from the user device a plurality of transceiver signal strength values, which are determined based on signals received from the plurality of wireless transceivers, the system determines an approximate current location for the user within the identified structure based upon at least one of the user device signal strength values, and at least one of the transceiver signal strength values.

After determining the user's location, the system determines the route using a route planning system, wherein the route planning system determines a route based upon the current user location, item location, and structure map. The route planning system is comprised of a route planning logic operable to perform the following method for determining a route. Identifying an item location reference for each identified item within the identified structure based upon item location information retrieved from the item database, and identifying an origin reference, which may be an approximate current location for the user or an entrance of the identified structure. Next, it identifies a termination reference, which may be an approximate current location for the user or an entrance of the identified structure. Then it plots the item location references, the origin reference, and the termination reference on the map. Next it determines a route between the origin reference, the item location references, and the termination reference, wherein the route begins at the origin reference and ends at the termination reference, and the route passes through all the location references.

The system also tracks the user along the route using a route tracking system. The route tracking system performs the following method. It presents a map view, representing the map, the route, and the approximate current user location on the user interface. Then it updates the user interface, upon detection that the user's approximate current location has changed, to represent the changed the user's approximate current location within the identified structure on the map; and the map view is capable of being manipulated by the user to alter at least one characteristic of the map view.

Additionally, at least one short-range wireless checkout transceiver may be located at a predetermined termination reference. At least one short-range item transceiver is associated with at least one identified item. Then, if at least one identified item is located within a user's shopping cart, the system's processor is operable to, upon detection that the user is approaching the termination reference, to perform the following method. First it receives item identifiers from the checkout transceivers, wherein the item identifiers are received by the checkout transceivers from the item transceivers using short-range wireless communications. Then it identifies each predetermined in-cart item based upon the received item identifiers, and determines a retail value for all in-cart items. Next, it determines whether the user has pre-paid for any in-cart items and calculates a total purchase price based upon the retail value of all in-cart items, and whether the user has pre-paid for any in-cart items. Finally, it processes a payment from the user for the total purchase price.

The following method is one illustrative way for the location system to operate. First the system receives from a user device a list of identified items, containing at least one identified item, wherein the identified item has an associated item location, which specifies the identified item location within a structure. Next, the system plots the item location on a map of the structure and determines a user location based upon latency values associated with a plurality of wireless transceivers located at predetermined locations within the structure and with the user device. Alternatively, it may determine the user location based upon signal strength values associated with a plurality of wireless transceivers located at predetermined locations within the structure and with the user device. It then receives user location updates in response to a detection that the user location has changed, wherein the location updates include an updated user location. Then it determines an origin location reference, which may be an approximate current location for the user or an entrance of the identified structure. Next, it determines a termination reference, which may be an approximate current location for the user or an entrance of the identified structure. Then it plans a route for display on the user device, wherein the route begins at the origin location reference, passes through every item location, and ends at the termination location reference. The order in which the route passes through the item locations is organized such that the resulting route is optimized based upon any combination of the group consisting of total route distance, approximate traversal time, characteristics of the identified items, and advertising considerations.

As the user follows the route, the system presents a follow-along display including the map, the route, and an icon representing the user location on the user device. It then updates the follow-along display to reflect the updated user location upon reception of the user location updates, and alters the follow-along display in response to the reception of user commands, which may be any type of input including movement or non-movement.

As the user nears the end of the route, the system then receives item identifiers from one or more checkout transceivers, wherein the item identifiers are received by the checkout transceivers from item transceivers associated with the identified items using short-range wireless communications, and it identifies in-cart items based upon the received item identifiers. Then it determines a retail value for all in-cart items, by determining whether the user has pre-paid for any in-cart items and calculating a total purchase price based upon the retail value of all in-cart items and whether the user has pre-paid for any in-cart items. It then processes a payment from the user for the total purchase price.

The above summary of the present location system is not intended to represent each embodiment, or every aspect of the present location system. Additional features and benefits of the present location system are apparent from the detailed description, and figures below, to those skilled in the art.

DETAILED DESCRIPTION OF THE INVENTION

The present location system is a method and apparatus for the use of purchasing a product through a mobile device, and being directed to the product in the physical world. In the following description, numerous specific details are set forth to provide a more thorough description of embodiments of the location system. It will be apparent, however, to one skilled in the art, that the embodiments of the present location system may be practiced without these specific details. In other instances, well known features have not been described in detail so as not to obscure the present location system.

Embodiments of the present location system illustrate gathering position information of mobile and stationary entities and using the position information to display the user's location within an environment, whilst simultaneously displaying targeted advertising and tracking user's purchases. Embodiments of the present location system use a plurality of signal transmitting devices and/or a plurality of signal gathering devices to gather position information of devices, objects and persons.

Figure 5A:
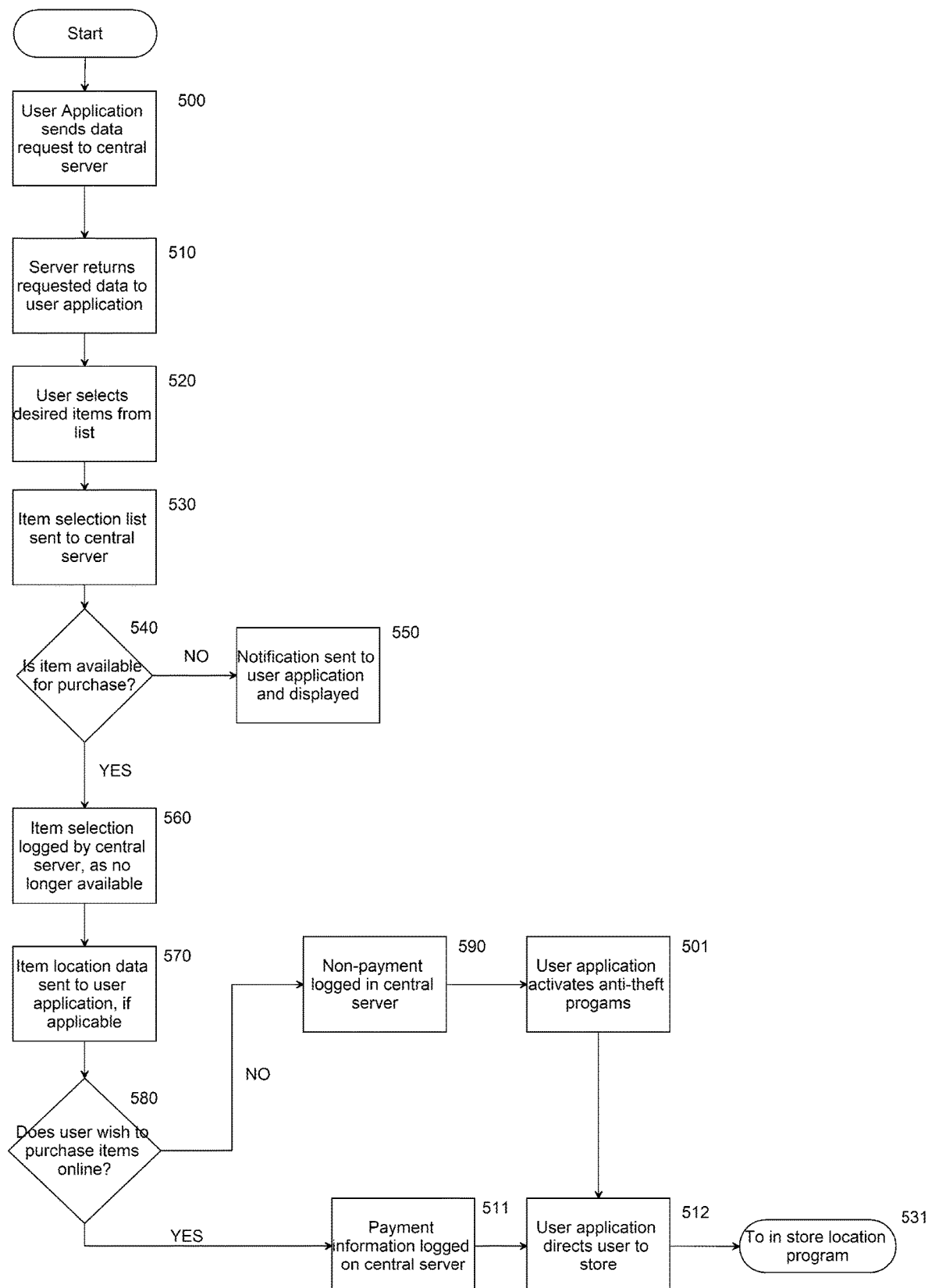
FIG. 5A is a block diagram of the online purchasing program.
Figure 5B:
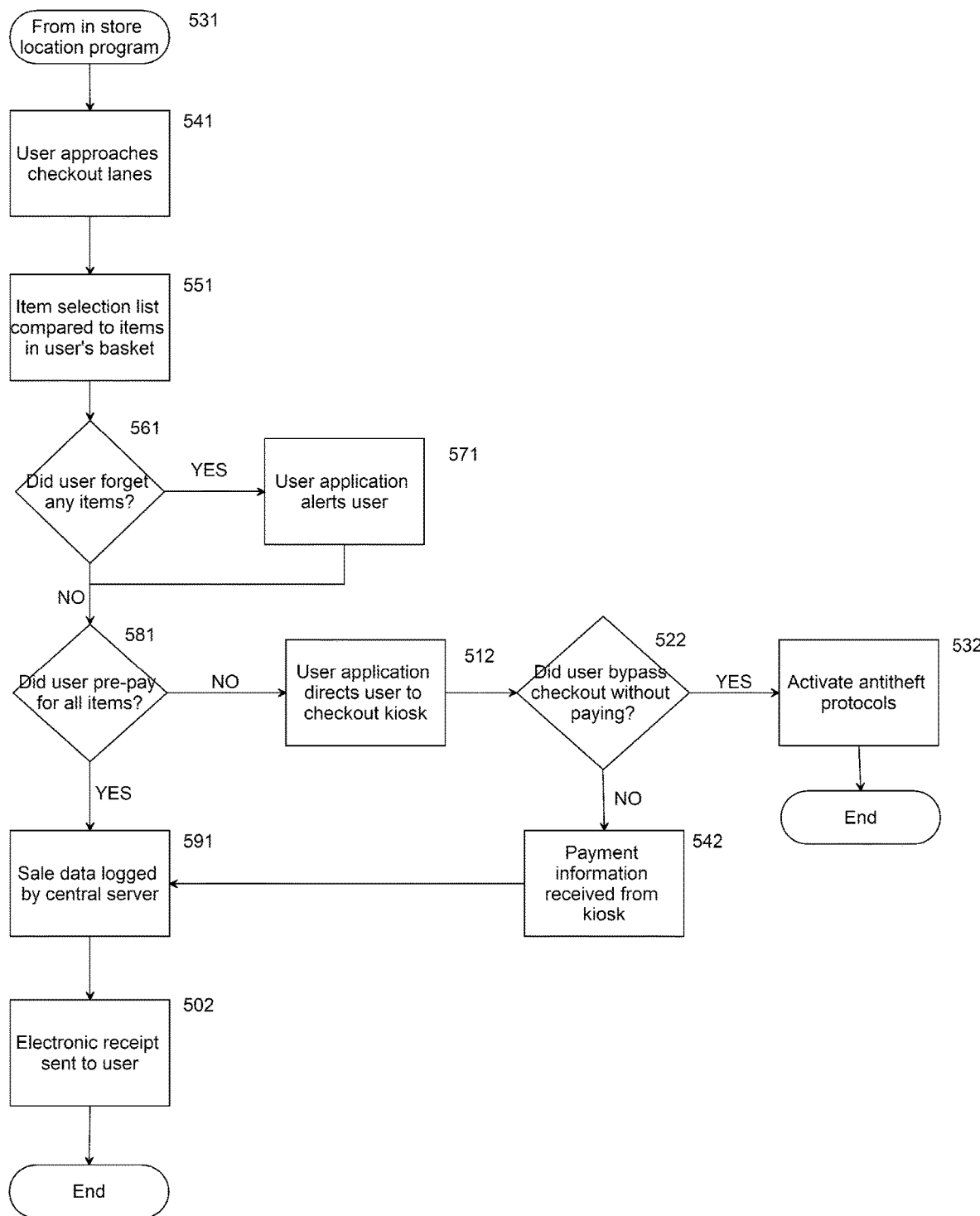
FIG. 5B is a block diagram of the online purchasing program.
Figure 6:
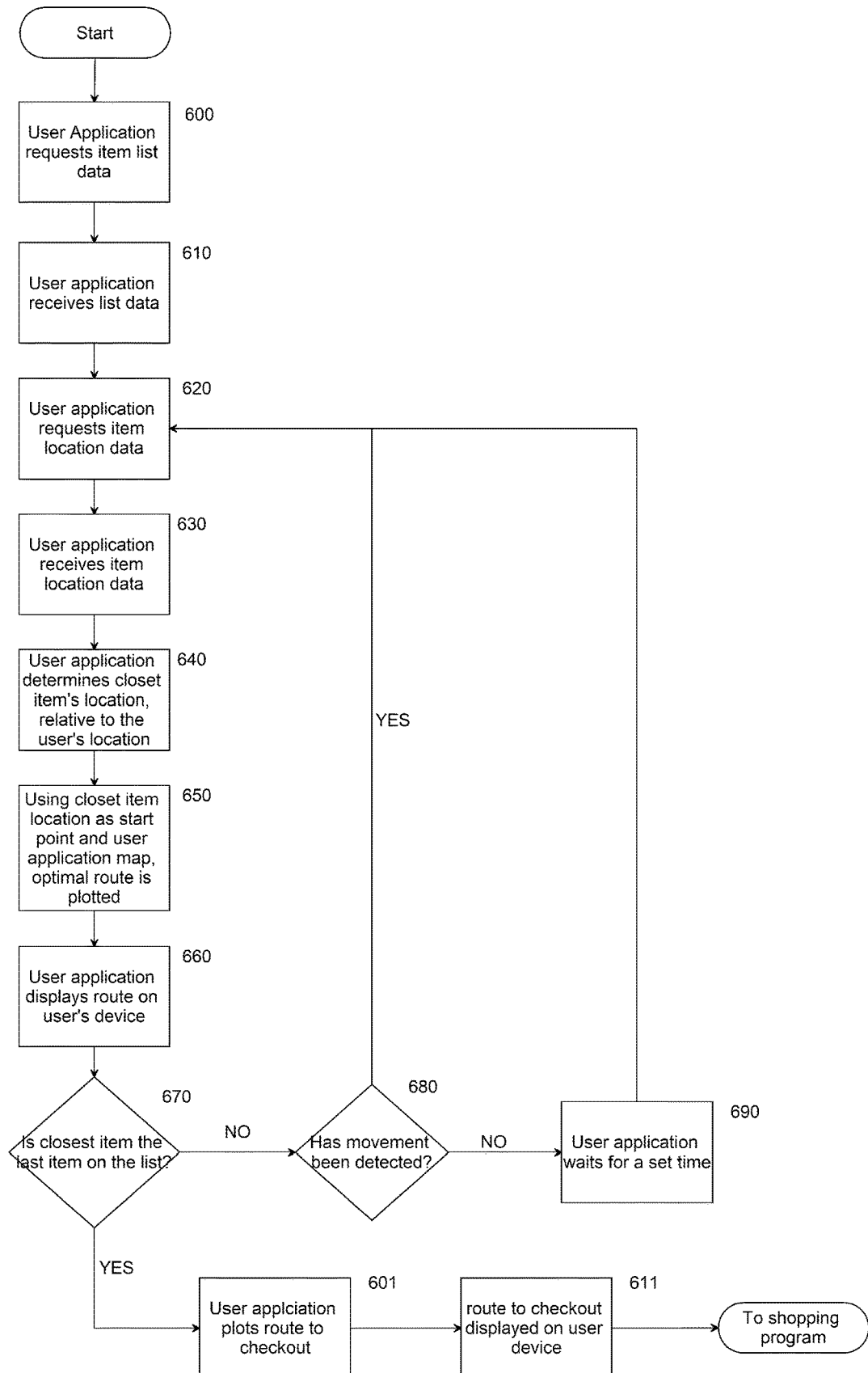
FIG. 6 is a block diagram of the route planning system.
Figure 7A:
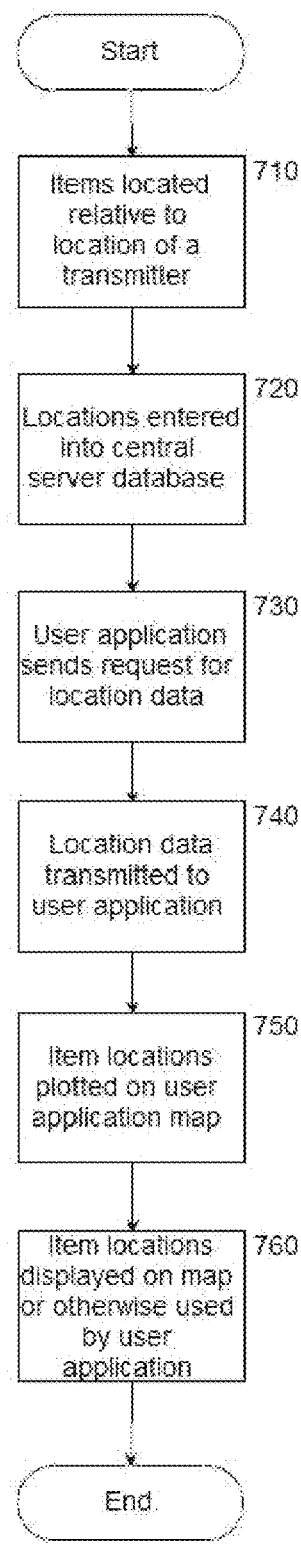
FIG. 7A is a block diagram of a fixed item location mapping system.
Figure 7B:
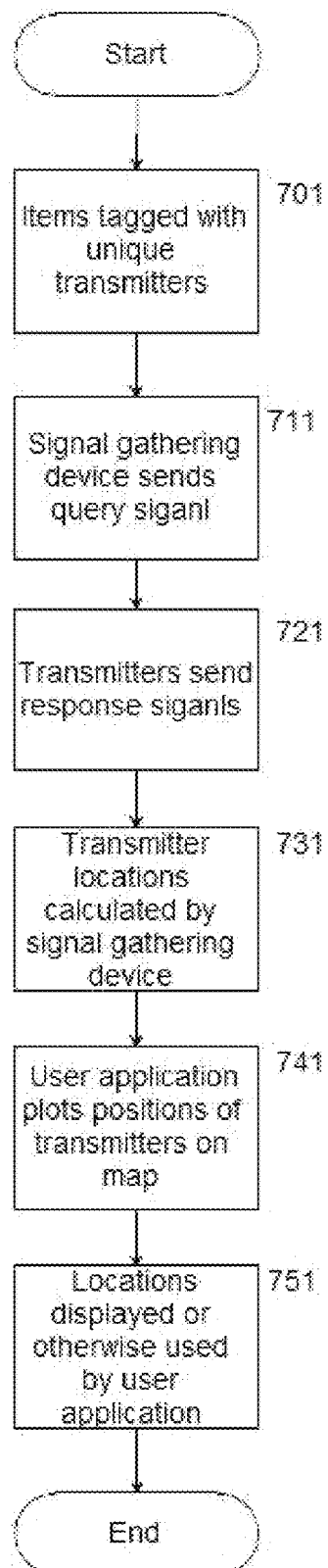
FIG. 7B is a block diagram of a dynamic item location mapping system.

FIGS. 1, 5, 6, and 7 illustrate one embodiment of the location system. The process begins as illustrated in FIG. 5. At block 500, the user application sends a data request to the central server, which returns the requested information to the user application at block 510. Then, using the list data from the server, at block 520 the user application displays a list of products from which the user can select the desired items. At block 530, the list of selected items is transmitted back to the central server, where the list is compared to the list of available items, at block 540. If the items are not available for purchase, the user is informed at block 550. If the items are available for purchase, the list is logged by the central server at block 560. Then, at block 570, the location data for the items is acquired as shown in FIG. 7.

At block 710, the items are located in the store at known locations, relative to the transmitters. Then, at block 720, the item's locations are entered into the central server. At block 730, the user application requests the location data, which is transmitted to the user application by the central server at block 740. The item location is then plotted on the user application map by the user application, at block 750. Returning to FIG. 5, at block 580, the user is queried whether the user wishes to submit payment online. If the user wishes does not wish to pay online, this preference is logged in the central server and antitheft protocols are activated, at blocks 590 and 501, respectively. If the user wishes to pay online, the record of payment is logged in the central server, at block 511. Then, at block 521, the user is directed to go to the store by the user application. Once the user arrives at the store, the user is directed to the selected items as shown in FIG. 6.

Figure 1:
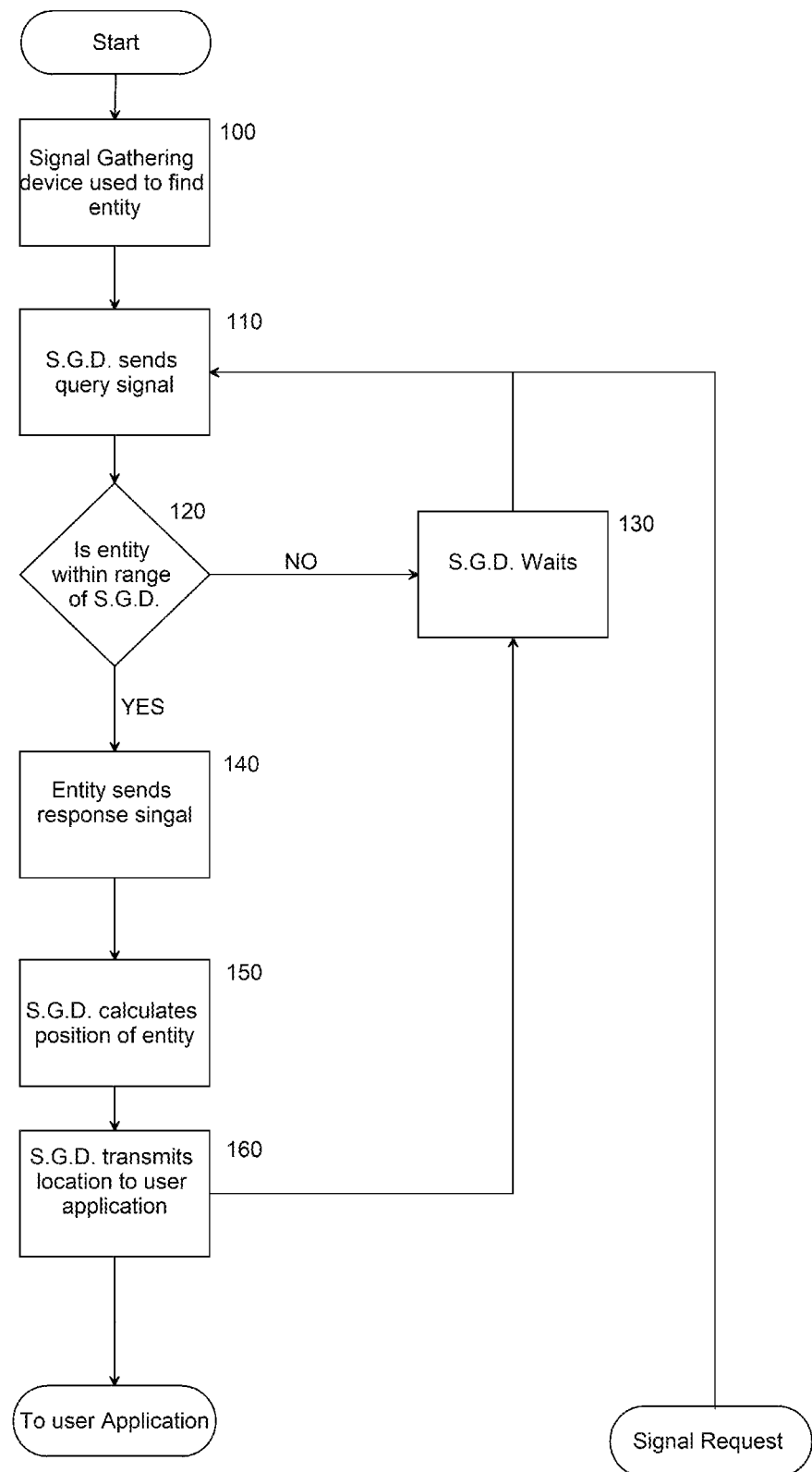
FIG. 1 is a block diagram of an active location system.
Figure 2:
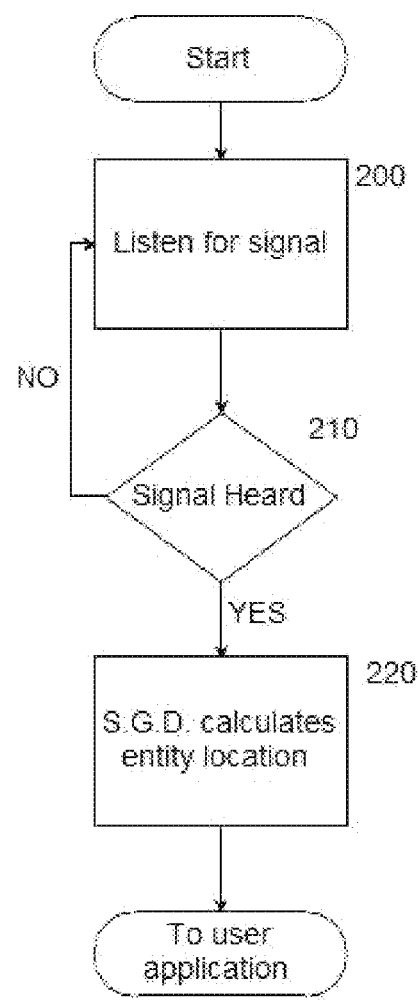
FIG. 2 is a block diagram of a passive location system.

At block 600, the user application requests the item list data from the central server, which is received at block 610. The user application then requests the location data as shown in FIG. 1. FIG. 1 illustrating a signal gathering device being used to find the position information needed by the user application. At block 100, a signal gathering device is used to find the entity. At block 110, the signal gathering device sends a signal. At block 120, if the entity is not present, or within range of the signal gathering device, then at block 130 no return signal is received by the signal gathering device. If at block 120 the entity is present or within range, then at block 140, the signal transmitting device on the entity returns a signal to the signal gathering device indicating the presence of the entity. At block 150, the signal gathering device calculates the position of the entity, and at block 160 this information is forwarded to the user application, which is received by the user application at block 630, of FIG. 6. Using the received data, the user application determines the closest item to the user's current location, at block 640. Then, at block 650, the closest item is used as the starting point from which the route is plotted. The user application then displays the route, at block 660. The user application then determines if the closest item is the last item on the item list, at block 670. If the item is not the last item on the item list, the user application then updates the user's location, at blocks 680, 690. If the item is the last item on the item list, the user application plots the route to the checkout lanes, at block 601, which is displayed by the user application at block 611. As the user approaches the checkout lanes, the list of items is compared to the items currently in the user's basket, at block 551, shown in FIG. 5. The user is then alerted by the user application, if any items on the list are not present in the basket, at block 571. After all the items are in the basket, the user application checks the list of items present in the basket against the list of items that the user has pre-paid for, at block 581. If the user has pre-paid for all of the items, the sale data is logged by the user application and transmitted to the central server, at block 591, and an electronic receipt is sent to the user, at block 502. If the user did not pre-pay for all or any of the items in the basket, the user application directs the user to a checkout kiosk, at block 512. If the user bypasses the checkout kiosk, with paying, the security protocols go into effect, at block 532. If the user submits the payment information at the checkout kiosk, the payment information is transmitted to the central server at block 542. Then, the sale data is logged by the central server, at block 591, and an electronic receipt is sent to the user, at block 502.

Figure 3:
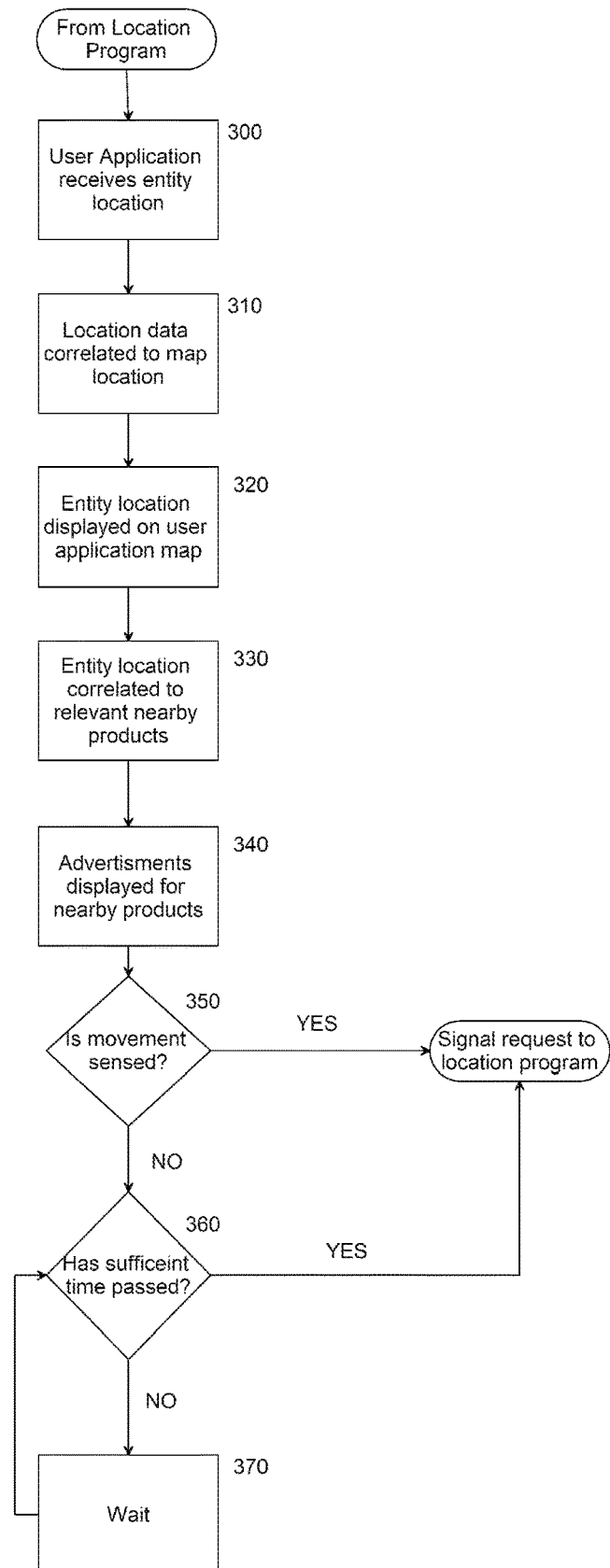
FIG. 3 is a block diagram of user application advertising.
Figure 4:
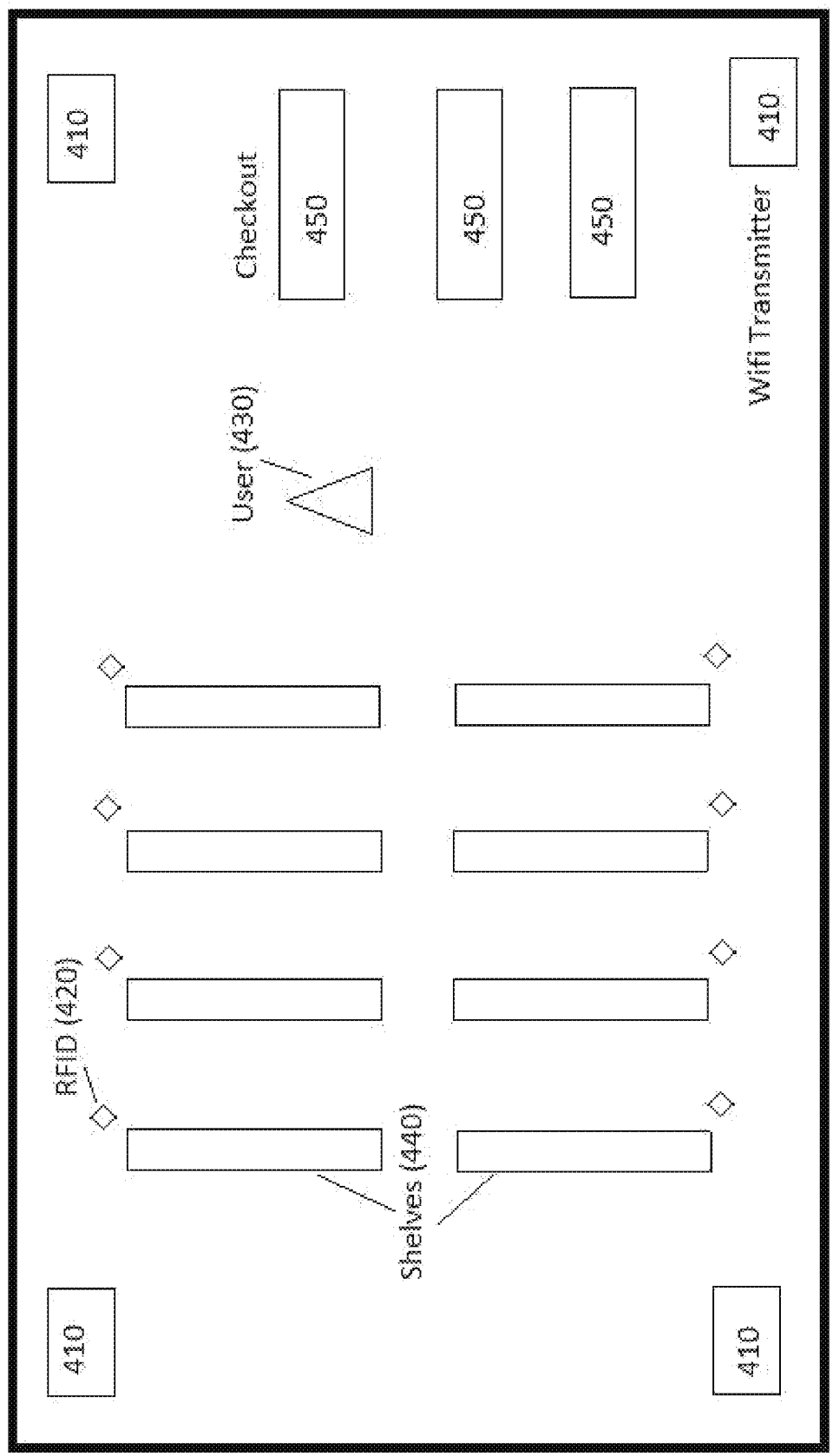
FIG. 4 is a possible floor plan for a user location system.

FIG. 4 illustrates a plan view of a room 400, containing RFIDs 420, WiFi transmitters 410, the signal gathering device 430, store shelves 440, and checkout stands 450. The query signal is sent from the signal gathering device 430 and is the responses signals are sent from both the RFIDs 420 and the WiFi transmitters 410. Once received the signal gathering device, which also contains the user application, displays the user's location on a digital map representing the room 400. The user application then displays advertising based on the user's location in the room 400 and the user's proximity to the store shelves 440. All of which is done as shown in FIGS. 1 through 7.

FIGS. 1, 3, 4 illustrate another possible embodiment of the location system, with FIG. 1 illustrating a signal gathering device being used to find the position information needed by the user application. At block 100, a signal gathering device is used to find the entity. At block 110, the signal gathering device sends a signal. At block 120, if the entity is not present, or within range of the signal gathering device, then at block 130 no return signal is received by the signal gathering device. If at block 120 the entity is present or within range, then at block 140, the signal transmitting device on the entity returns a signal to the signal gathering device indicating the presence of the entity. At block 150, the signal gathering device calculates the position of the entity, and at block 160 this information is forwarded to the user application, which begins the process as illustrated in FIG. 3. The user application receives the location data at block 300. At block 310, the location data from the signal gathering device is correlated to the approximate location on the user application map display and is then displayed at block 320. At block 330 the location data is used, in conjunction with targeted advertising data, to produce a list of relevant advertisements for display. The advertisements are then displayed at block 340. At block 350, the user application sends for new location data, if movement is sensed or sends for new location data after sufficient time has passed, if no movement is sensed, at block 360.

FIG. 4 illustrates a plan view of a room 400, containing RFIDs 420, WiFi transmitters 410, the signal gathering device 430, store shelves 440, and checkout stands 450. The query signal is sent from the signal gathering device 430 and is the responses signals are sent from both the RFIDs 420 and the WiFi transmitters 410. Once received the signal gathering device, which also contains the user application, displays the user's location on a digital map representing the room 400. The user application then displays advertising based on the user's location in the room 400 and the user's proximity to the store shelves 440.

Figure 8:
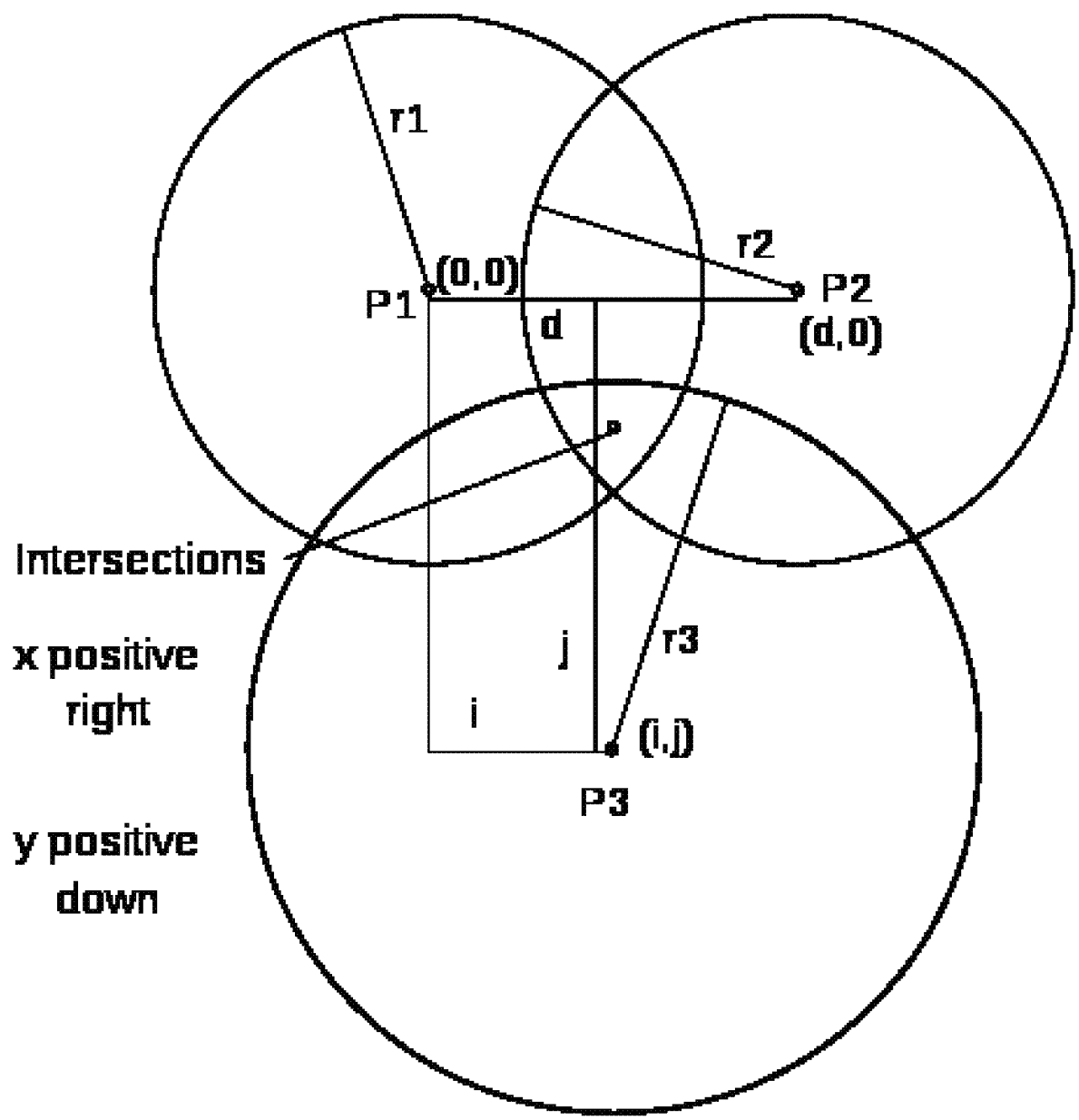
FIG. 8 is an example of location determination via trilateration.

FIG. 8 Illustrates how, In one embodiment, trilateration may be used to calculate the position of the user. Transmitters are located at points P1, P2, and P3. By using the measured distance from each transmitter, r1, r2, r3, the device makes three circles, C1, C2, C3, which have the measured distance r1, r2, r3 from one transmitter to the device as the radius. P1 and r1, describe circle C1, P2 and r2, describe circle C2, and P3 and r3, describe circle C3. The distance d between transmitters P1 and P2 along the x-axis is known. The distance i between transmitters P1 and P3 along the x-axis is known. The distance j between transmitters P1 and P3 along the y-axis is known. Or stated another way transmitter P1 is location at the origin (0,0) of the coordinate system, transmitter P2 is located at (d,0), and P3 is located at (i,j). The point at which circles C1, C2, and C3 intersect is the location of the user device UD1. The following equations, in conjunction with FIG. 8, describe the location of a device relative to three transmitters of known location, with the user device UD1, being located at (x,y,z).

$$x = \frac{r_1^2 - r_2^2 + d^2}{2d}$$

$$y = \frac{r_1^2 - r_3^2 + i^2 + j^2}{2j} - \frac{i}{j}\left(\frac{r_1^2 - r_1^2 + d^2}{2d}\right)$$

$$z = \pm\sqrt{r_1^2 - x^2 - y^2}$$

As the user device UD1 may be located above or below the x-y plane, for each dimension of accuracy, n+1 transmitters of known location are needed. Thus, to locate a device on a 2-D map, three transmitters are required. Once located, the user's mobile device UD1 will display the layout of the store 400, and the mobile application will plot the item locations and user location UD1 on the store layout map. Using this information the optimal route through the store may be calculated and displayed on the user's mobile device.

Figure 9A:
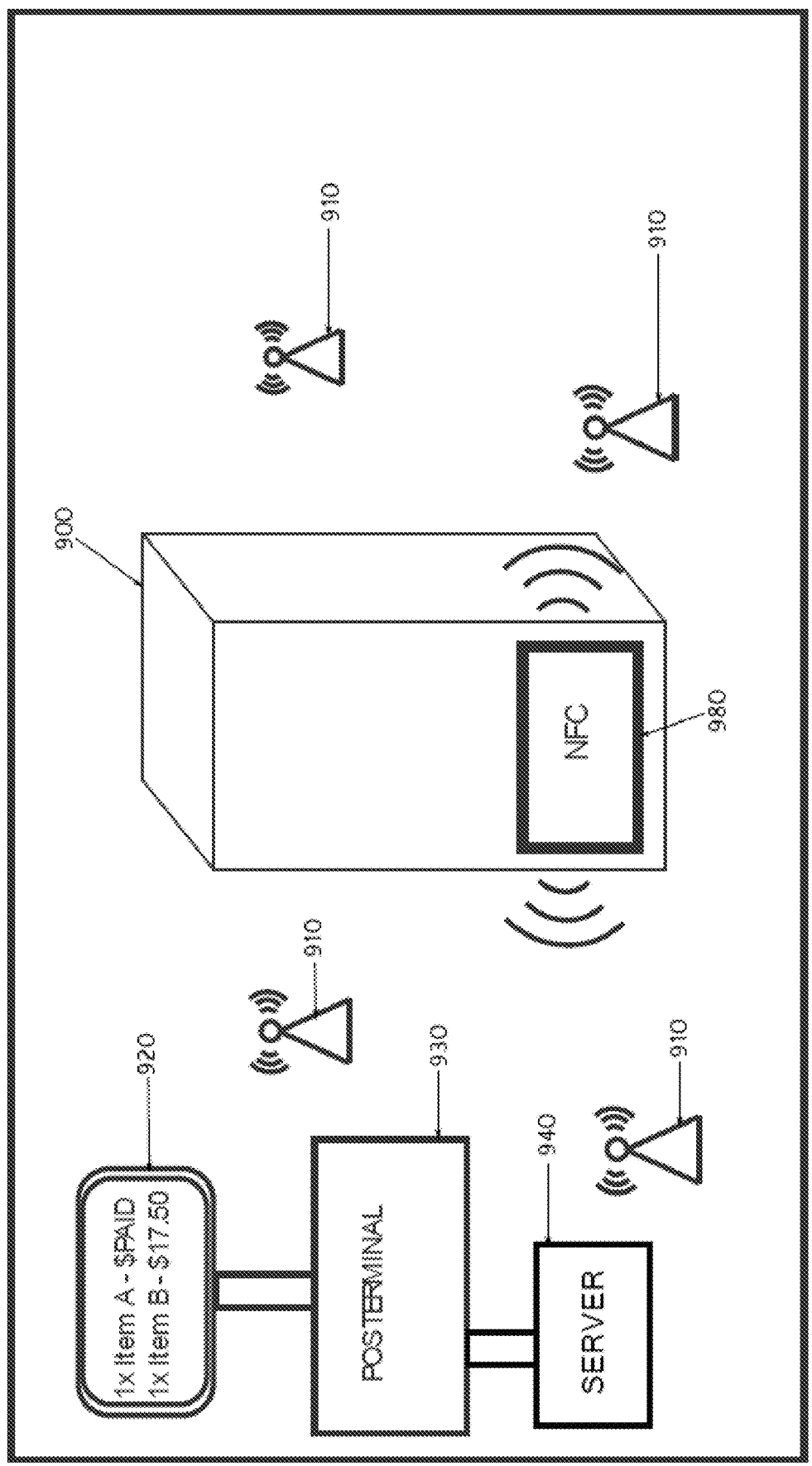
FIG. 9A is an overview of the components of the simple checkout system.

FIG. 9A illustrates a possible embodiment of the location system using a simple checkout system. The Product has been affixed with a wireless tag 980, such as, in two non-limiting examples, NFC and RFID. The wireless tag 980 emits a passive signal that uniquely identifies the product to which it is affixed. Around the POS (Point of Sale) terminal 930 are wireless transceivers 910 arranged such that the wireless transceivers 910 can receive the signal from the wireless tag 980. These wireless transmitters 910 are coupled to the POS terminal 930, which is connected to the server 940, which contains the data associated with the products, customers, and transactions. When a customer places the product 900 containing a tag in the proper location at the POS terminal 930, at a checkout, for example, the POS terminal 930 will receive the uniquely identifying signal via the wireless transceivers 910, the unique signal having been received from the wireless transceivers 910 from the wireless tag 980. The POS terminal 930 will cross-reference the signal with data contained within the POS terminal 930 or the Server 940 to determine which product 900 has been scanned. The POS terminal 930 is also configured to identify whether the product has been pre-paid for by the customer by referencing payment data 920 located on the server 940. If any unpaid items remain, the POS terminal 930 can add the price of the Product 900 to the overall total at checkout, without the need for scanning barcodes or manually entering the item.

Figure 9B:
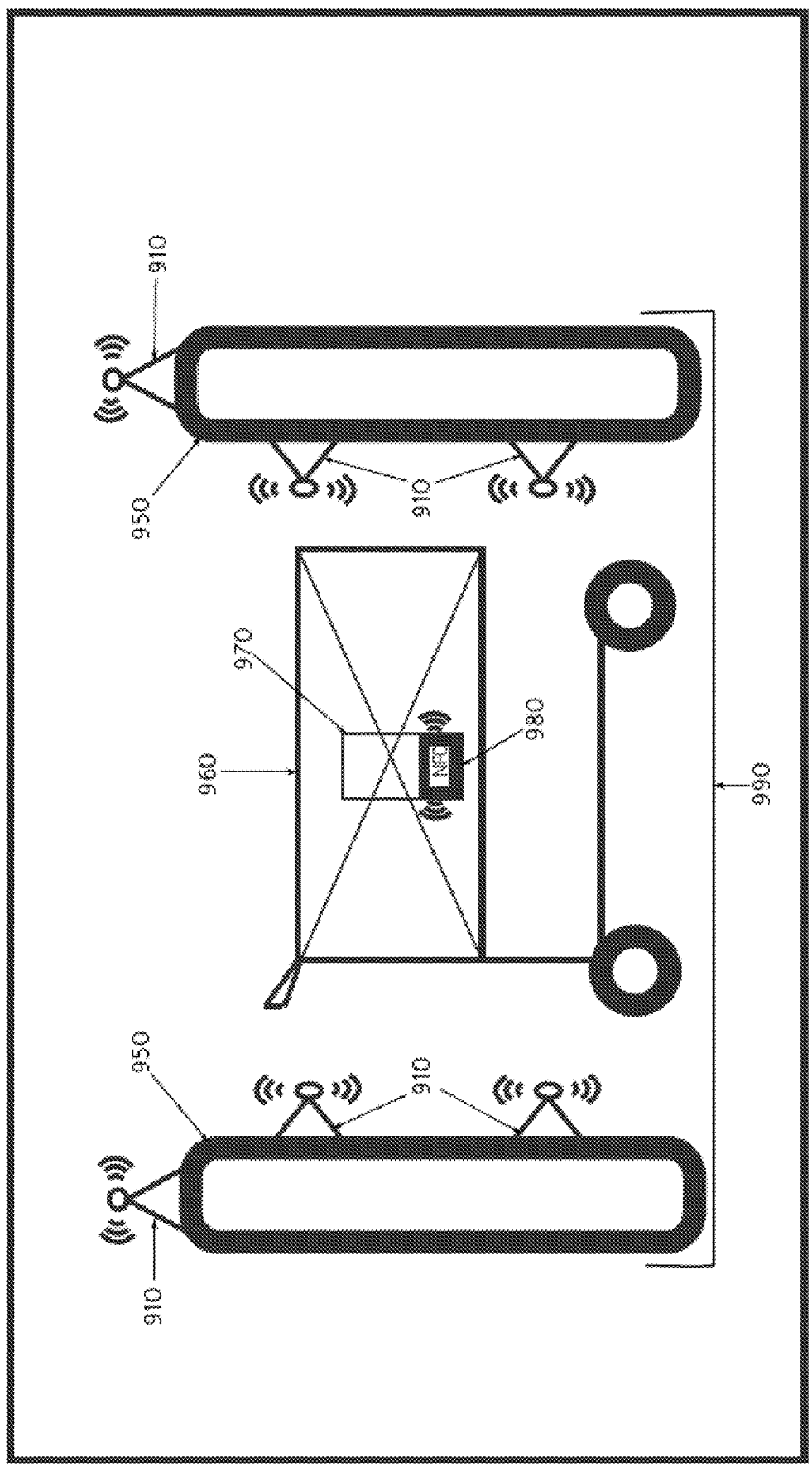
FIG. 9B is an over of the simple checkout area.

FIG. 9B depicts another possible embodiment of the simple checkout system requiring even less effort by the consumer and checkout employee. As shown in FIG. 9B, the customer navigates his shopping cart 960, basket or equivalent, to a designated simple checkout area. The simple checkout area 990 is configured to include scan towers 950. The scan towers 950 include a number of transceivers 910, which are arranged in such a way as to be able to scan and distinguish a number of items within the shopping cart 960. The products 970 in the shopping cart 960 emit their unique signal, which is received by the Transceivers 910 located on the Scan Towers 950. This information is then passed along to the POS terminal 930 or other checkout system, which communicates with the store's computer system and server 940 to complete the transaction.

Figure 10:
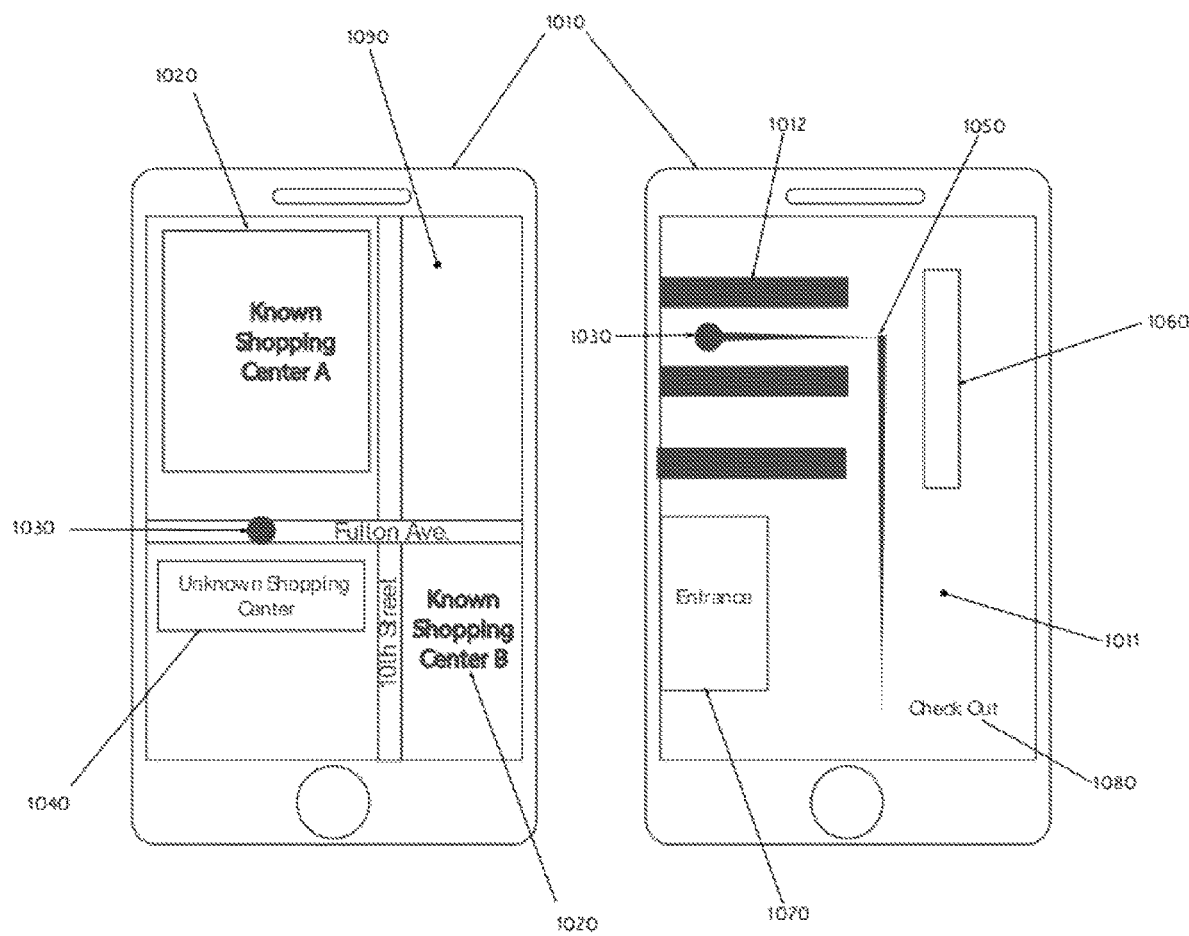
FIG. 10 is an illustration of user device in operation.
Figure 11:
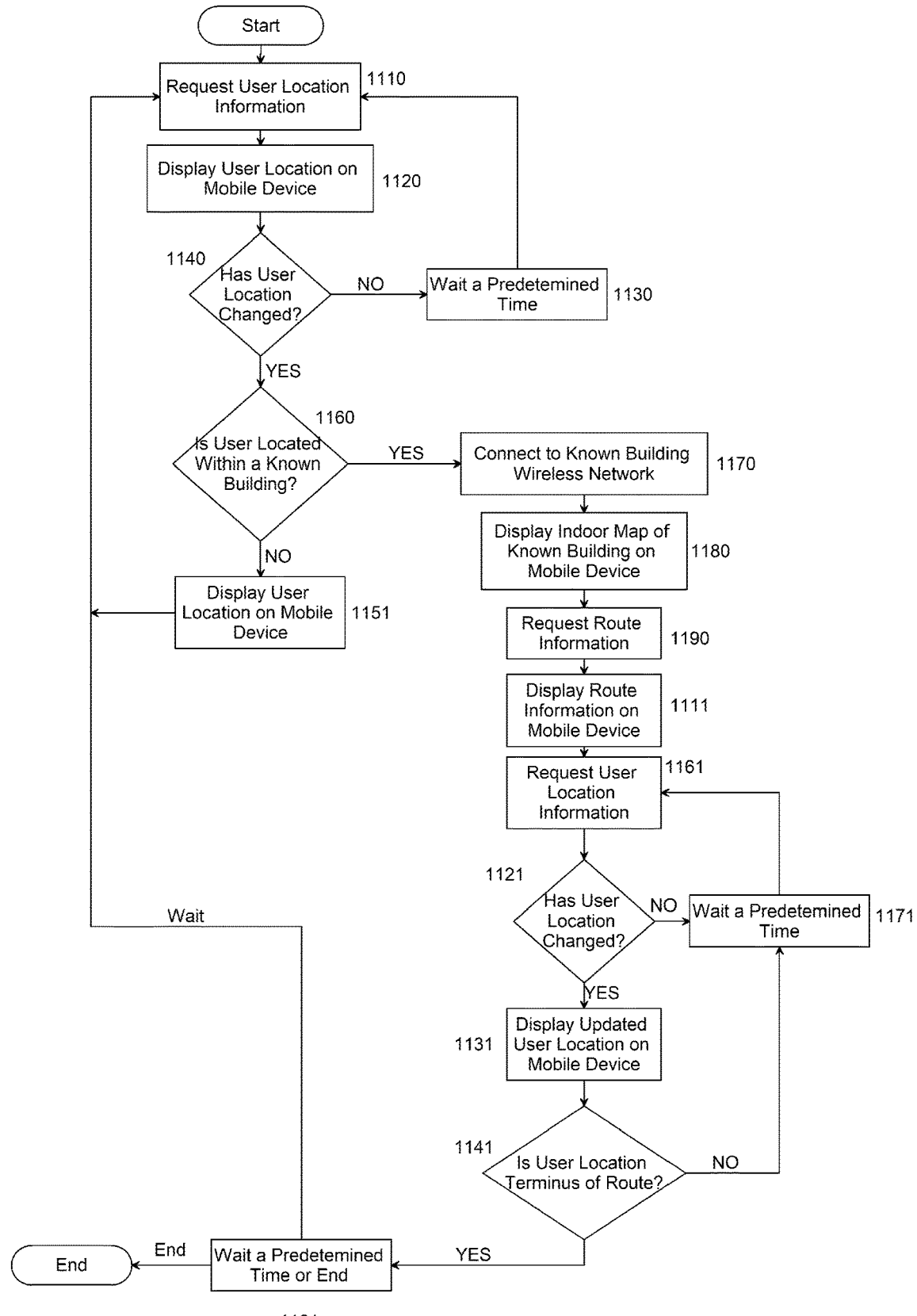
FIG. 11 is a block diagram of the map view switching system.

FIGS. 10 and 11 illustrate the system switching between views as the user's position changes. In FIG. 10, as the user's position 1030 approaches a known shopping center, or store, 1020, the user's mobile device 1010 displays an outdoor map 1090 with the user's location 1030, relative to any known shopping centers 1020 and any unknown buildings 1040. Once the user enters the known shopping center 1020, the user's mobile device 1010 displays an indoor map 1011 of the shopping center 1020. The indoor map 1011 includes the user's location 1030, the entrance to the store 1070, the checkout locations 1080, and the shelves with relevant items 1060. Any other obstacles, shown here as shelves, 1012 are also displayed. The user is guided through the store by a route 1050 displayed on the indoor map 1011. The route 1050, guides the user through the store to all relevant shelves 1060, where the desired items are located. The route 1050 is automatically updated as the user's position 1030 changes, with the termination point 1080 of the route 1050 being the check out area in this example. The termination point 1080 may also be the exit or entrance 1070 of the known shopping center 1020. Alternatively, if the user enters an unknown building 1040, the user's mobile device 1010 continues to display the outdoor map 1090.

FIG. 11 illustrates one possible embodiment of the map view switching operation. The process begins as shown, with the application requesting user location information at block 1110. The application then displays the user location on the user's mobile device at block 1120. Next, the application queries whether the user's location has changed since the last request at block 1140. If not, the application waits at block 1130, then begins again at block 1110. If the user has moved, the application queries whether the user is now located within a known mapped building at block 1160. If not, then the application displays the user's location at block 1151, then returns to block 1110. If the user is in a known building, the application attempts to connect to the building's wireless network at block 1170. It then display's the indoor map of the building on the user's mobile device at block 1180. Next, the application requests route information at block 1190, and displays the route on the mobile device at block 1111. Once the route is displayed, the application requests the user's location at block 1161 and then queries whether the user location has changed at block 1121. If not, the application waits at block 1171 before returning to block 1161 and requesting the user location information. If the user's location has changed, the updated user location is displayed on the user's mobile device at block 1131. The application then queries whether the user's location is the terminus of the route at block 1141. If so, then the application waits at block 1181, before returning to block 1110.

Figure 12:
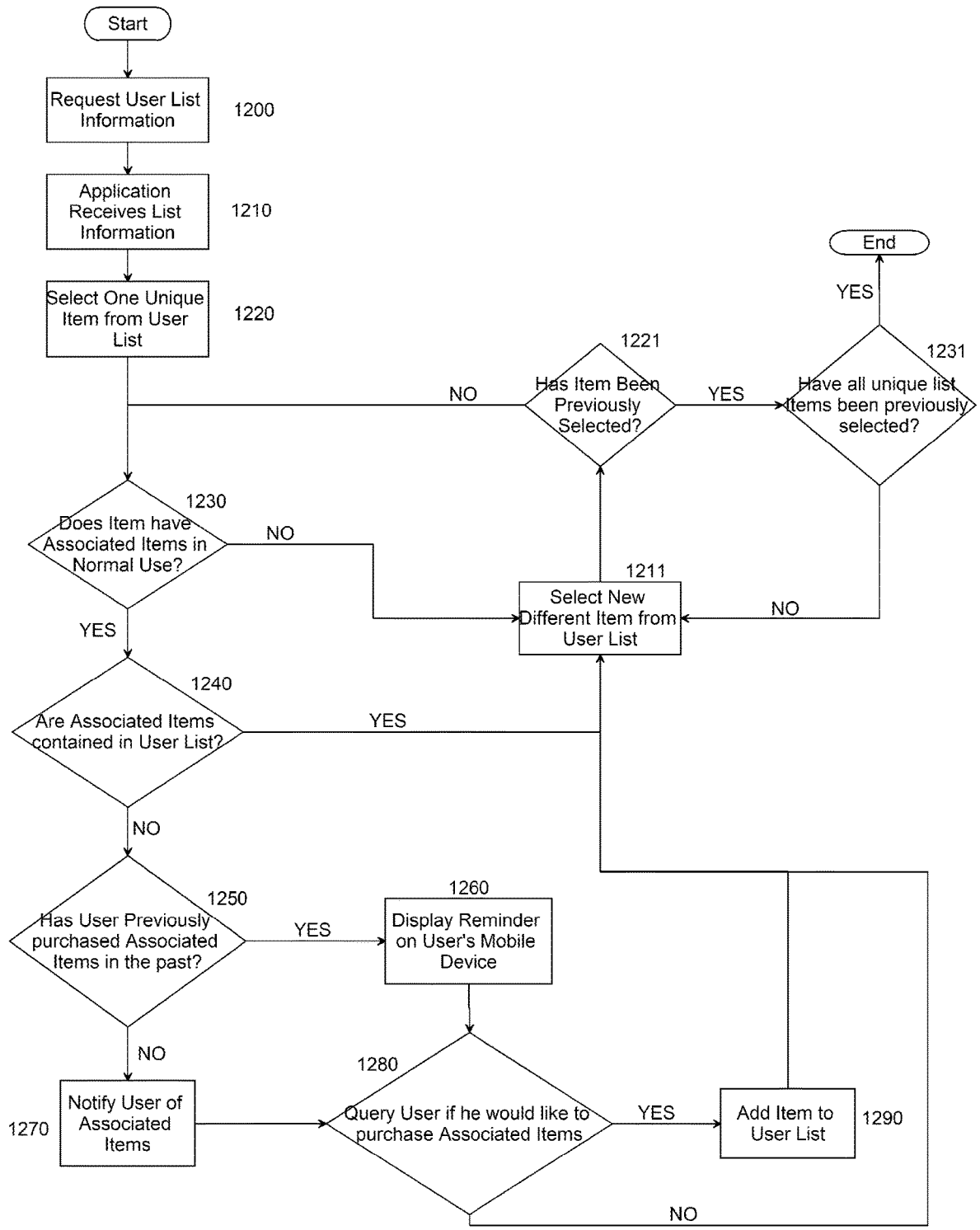
FIG. 12 is a block diagram of an intelligent list generation system.

FIG. 12 illustrates one possible embodiment of the intelligent list generation process for the location system. The process begins as shown, with the location system requesting the user's list information at block 1200. Once the system receives the user's list information at block 1210, one unique item, i.e. one item type, is selected from the list at block 1220. Then at block 1230, the system determines if the item has other item commonly associated with it in normal use, i.e. spaghetti sauces and noodles. If the item does not, the system selects a different item from the list at block 1211.

If the item does, the system then determines if the associated items are already on the user's list at block 1240. If the associated items are on the list, the system selects a different item from the list at block 1211. If the associated items are not on the list, the system determines, whether the user has previously purchased the item and associated items together in the past at block 1250. If the user has purchased the item and associated items together in the past, the system displays a reminder on the user's mobile device at block 1260. If the user has not purchased them together, the system displays a notification of the associated items on the user's mobile device at block 1270.

Next, the system queries the user whether the user wishes to purchase the associated items at block 1280. If the user wishes to purchase the associated items, the system adds the associated items to the lost at block 1290 and then a new item is selected from the lost at block 1211. If the user does not wish to purchase the item, the system selects a new item from the user list at block 1211.

Once the system has selected a new item from the list, the system determines if the item has previously been selected. If the item has not been previously selected, the system returns to block 1230. If the item has previously been selected, the system determines if all the unique items have been selected from the user list at block 1231. If all the unique items have not been selected, the system selects a new item from the list at block 1211. If all the unique items have been selected, the intelligent list selection program ends.

Numerous modifications to the features described and shown are possible. Accordingly, the described and illustrated embodiments are to be construed as merely exemplary of the inventive concepts expressed herein and addressed in the appended claims.

We claim:

1. A method for indoor navigation, the method comprising:
   receiving a list of identified items from a user device, wherein said list contains at least one identified item, wherein said at least one identified item has an associated item location and item physical characteristics, wherein said item location specifies a location of said identified item within a structure, and wherein said item physical characteristics include at least one of a size, weight, or temperature requirement;
   reordering said list based on the item location and the item physical characteristics;
   determining an origin location reference;
   determining a user location;
   planning a route for display on said user device, wherein said route begins at said origin location reference and passes through every item location;
   receiving user location updates in response to a detection that said user location has changed, wherein said location updates include an updated user location;
   presenting a follow-along display including said map, said route, and an icon representing said user location;
   updating said follow-along display to reflect the updated user location upon reception of said user location updates; and
   altering said follow-along display in response to the reception of user commands.

2. The method of claim 1, wherein said planning said route further comprises modifying said route based on advertising considerations, wherein said advertising considerations comprise agreements between an operator of said structure and at least one vendor advertiser.

3. The method of claim 1, wherein said user commands include commands to remove at least one said identified item from said list.

4. The method of claim 1, wherein determining said user location is performed using latency values associated with a plurality of wireless transceivers located at predetermined locations within said structure using said user device, wherein said wireless transceivers are at least one of a group consisting of Wi-Fi and Bluetooth transceivers.

5. The method of claim 1, wherein determining said user location is performed using signal strength values associated with a plurality of wireless transceivers located at predetermined locations within said structure using said user device.

6. The method of claim 2, wherein said advertising considerations include preexisting agreements between an entity associated with said structure and a third-party advertiser, wherein said route is modified such that at least a portion of said route passes by a particular location specified by said third-party advertiser.

7. A system for indoor navigation comprising:
   an application configured to run on a wireless device, wherein said application is further configured to display a user interface to a user of said wireless device, wherein said application further comprises an item selection module configured to allow said user to select at least one item using said user interface;
   a structure map database containing at least one structure map of at least one structure;
   an item database containing item information, wherein said item information comprises item locations and physical characteristics, wherein said item physical characteristics include item size, weight, and temperature requirements;
   a route planning module configured to determine a route through at least one identified structure, wherein said route is determined at least in part based on said item physical characteristics of said selected item, and wherein said route passes through every item location of every item selected by said user;
   a route tracking module operable to track said user's position on said route; and
   a plurality of WiFi or Bluetooth transceivers located within said structures.

8. The system according to claim 7, wherein said route tracking module is configured to utilize said plurality of WiFi transceivers located within said structures to determine a current position of said user within said identified structure, and wherein said user interface is further configured to display said current position of said user.

9. The system according to claim 7, wherein said route tracking module is configured to utilize one of signal strength or latency values received by one of said wireless device or plurality of WiFi transceivers to determine a current position of said user within said identified structure.

10. The system according to claim 7, wherein said route planning module determines said route based on said item locations stored in said item database, a current position of said user, and a termination reference associated with said identified structure, wherein said termination reference is one of a check-out location or an exit of said identified structure.

11. The system according to claim 7, wherein said item selection module is configured to receive user input of a plurality of items located in at least two structures, and wherein said route planning module is further configured to generate a route comprising a street route from a first identified structure to a second identified structure.

* * * * *